United States Patent
Kumar et al.

(10) Patent No.: US 11,086,726 B2
(45) Date of Patent: Aug. 10, 2021

(54) USER-BASED RECOVERY POINT OBJECTIVES FOR DISASTER RECOVERY

(71) Applicant: EMC IP Holding Company LLC, Hopkinton, MA (US)

(72) Inventors: Shiv Shankar Kumar, Pune (IN); Jai Prakash Gahlot, Pune (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/710,825

(22) Filed: Dec. 11, 2019

(65) Prior Publication Data
US 2021/0182151 A1 Jun. 17, 2021

(51) Int. Cl.
*G06F 11/14* (2006.01)

(52) U.S. Cl.
CPC ...... *G06F 11/1451* (2013.01); *G06F 11/1458* (2013.01); *G06F 2201/82* (2013.01)

(58) Field of Classification Search
CPC .......... G06F 11/1451; G06F 11/1458; G06F 2201/82; G06F 11/1446; G06F 11/1448; G06F 11/1456; G06F 11/1461
See application file for complete search history.

(56) References Cited

U.S. PATENT DOCUMENTS

| | | | | |
|---|---|---|---|---|
| 8,190,561 B1* | 5/2012 | Poole | ................... | H04L 67/322 707/610 |
| 2009/0292745 A1* | 11/2009 | Bose | ....................... | G06F 16/27 |
| 2011/0196835 A1* | 8/2011 | Kesselman | ............. | G06F 16/27 707/634 |
| 2011/0196873 A1 | 8/2011 | Kesselman | | |
| 2012/0117025 A1* | 5/2012 | Sagar | ..................... | G06F 16/184 707/610 |
| 2016/0004720 A1* | 1/2016 | Tabaaloute | ............ | G06F 16/128 707/639 |
| 2016/0224259 A1* | 8/2016 | Ahrens | ................. | G06F 3/0619 |
| 2018/0075118 A1* | 3/2018 | Bellemann de Leon | .................... | G06F 16/2358 |
| 2020/0218614 A1* | 7/2020 | Adduri | ................ | G06F 11/1451 |

OTHER PUBLICATIONS

Layton, Jeffrey B., Extended File Attributes Rock!, May 9, 2019, Retrieved from Google Feb. 11, 2021, https://www.linuxtoday.com/blog/extended-file-attributes-rock.html (Year: 2019).*
Non Final office action received for U.S. Appl. No. 16/710,939 dated Feb. 24, 2021, 21 pages.

* cited by examiner

*Primary Examiner* — Bryce P Bonzo
*Assistant Examiner* — Albert Li
(74) *Attorney, Agent, or Firm* — Amin, Turocy & Watson, LLP

(57) ABSTRACT

User-based recovery point objectives (RPOs) for disaster recovery are described herein. A method as described herein can include obtaining, by a device operatively coupled to a processor, transient information associated with a file stored by a data storage system; determining, by the device, whether the transient information associated with the file indicates that a condition for replicating the file has been met; and inserting, by the device, the file into a replication queue associated with the data storage system in response to a positive result of the determining.

20 Claims, 14 Drawing Sheets

USER-BASED RECOVERY POINT OBJECTIVES FOR DISASTER RECOVERY

TECHNICAL FIELD

The subject application is related to data storage, and more particularly, to techniques for managing data backup and protection in a data storage system.

BACKGROUND

As computing technology has advanced over time, so too has the amount and scope of data that can be maintained and analyzed via computer systems. For instance, the ability to manage very large data sets, commonly known as big data, has led to significant advances in fields such as manufacturing, media, science, and e-commerce, among many others. Data storage systems, such as those utilized in network-attached storage (NAS) platforms, provide the means by which these large sets of data can be maintained in an efficient and reliable way.

NAS systems and/or other file storage systems can utilize various techniques to protect data stored on the system. One such technique is replication, in which some or all data stored on the system is replicated (copied) to a secondary location, e.g., according to one or more replication policies. This process enables a client to connect to the secondary location to access the replicated files in the event of a primary site failure.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a data storage system is described herein. The data storage system can include a memory that stores executable components and a processor that executes the executable components stored in the memory. The executable components can include a file analysis component that extracts transient properties of a file stored by the data storage system, a replication conditioning component that determines whether the transient properties of the file satisfy a replication condition as defined by the data storage system, and a replication queue component that adds the file to a replication queue associated with the data storage system in response to the transient properties of the file being determined to have satisfied the replication condition.

In another aspect, a method is described herein. The method can include obtaining, by a device operatively coupled to a processor, transient information associated with a file stored by a data storage system; determining, by the device, whether the transient information associated with the file indicates that a condition for replicating the file has been met; and inserting, by the device, the file into a replication queue associated with the data storage system in response to a positive result of the determining.

In an additional aspect, a machine-readable medium including executable instructions is described herein. The instructions, when executed by a processor of a data storage system, can facilitate performance of operations including reading transient properties of a file stored by the data storage system, determining whether the transient properties of the file satisfy a trigger condition for replication of the file, and appending the file to a replication queue associated with the data storage system in response to the transient properties of the file satisfying the trigger condition.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Figure 1:
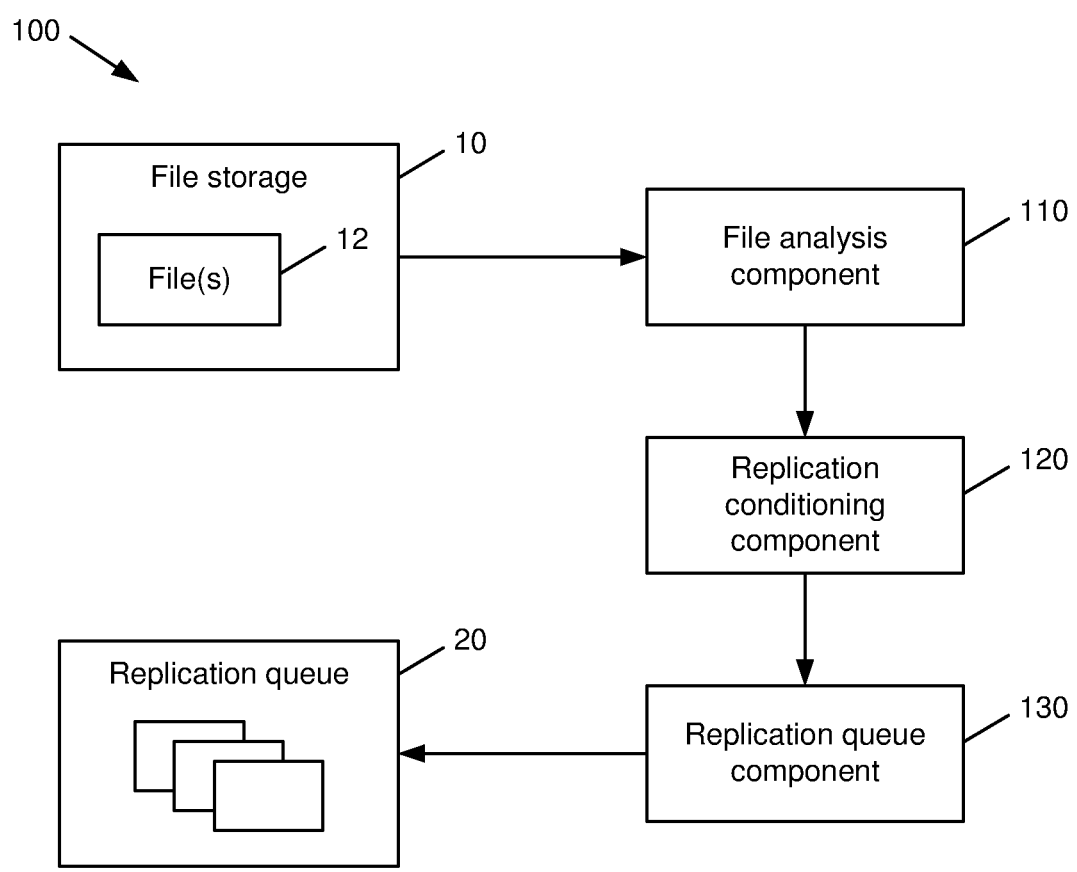
FIG. 1 is a block diagram of a system that facilitates user-based recovery point objectives for disaster recovery in a data storage system in accordance with various aspects described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In order to enhance the security of stored data, a file storage system can utilize a replication facility for disaster recovery. By way of example, a data storage system can include a primary storage cluster and one or more secondary storage clusters, and recurring replication jobs can be defined via replication policies on the primary cluster to replicate stored data to the secondary cluster(s). The primary and secondary storage clusters are generally associated with different computing sites; however, respective clusters associated with a data storage system could be hosted within a same site, distributed among several sites, and/or configured in any other suitable manner.

In an aspect, a replication policy can accept a storage location, e.g., as defined by a directory path or the like, and replicate the data at that location (e.g., files stored in the specified directories) to a secondary site. Replication policies can be configured and executed on the basis of recovery point objectives (RPOs) associated with different directories in an underlying disaster recovery plan. Replication policies can also use various filters as desirable to replicate specific files, or types of files, under a directory tree.

In another aspect, an RPO for a given directory can define a tolerable time interval between backup or replication operations for data stored in that directory. As such, the RPO for a directory defines a maximum tolerable time period for which data may be lost following a disaster event such as a total site failure. By way of example, an RPO of 24 hours for a given directory indicates that the contents of that directory are to be replicated no less frequently than once every 24 hours.

In addition to the above, it would be desirable for a data storage system to provide greater flexibility in designating specific files or other data stored at a primary storage site for replication according to varying RPOs. By way of specific example, because there are generally a variety of users of a file storage system with differing levels of role criticality, it would be desirable to implement varying RPO parameters for these users even within a same directory, e.g., such that low RPOs are assigned to highly critical users and vice versa. By doing so, the probability and/or severity of data loss for files belonging to and/or edited by a highly critical user in the event of a disaster can be reduced without expending additional system resources on frequent replication of data belonging to and/or edited by non-critical users.

With reference now to the drawings, FIG. 1 illustrates a block diagram of a system 100 that facilitates user-based RPOs for disaster recovery in accordance with various aspects described herein. System 100 as illustrated by FIG. 1 includes a file analysis component 110 that can extract transient properties of one or more files 12 stored by system 100, e.g., via a file storage 10. As used herein, a transient property of a file (or transient information associated with a file) refers to attributes, properties, etc., of a file that can change over time. Examples of transient information can include editors or modifiers of a file, the nature and/or extent of modifications to a file, file access history, contextual information, cloud subscription and/or service tier data, etc. Other examples are also possible.

System 100 further includes a replication conditioning component 120 that can determine whether the transient properties of a file 12, e.g., as determined by the file analysis component 110, satisfy a replication condition as defined by system 100. In an aspect, the replication conditioning component 120 can associate a file 12 with a given RPO based on the transient information extracted by the file analysis component 110 and determine whether replication of the file is warranted at a given time based on its RPO. Techniques that can be utilized by the replication conditioning component 120 for determining whether various conditions for replicating the file are met are discussed in further detail below.

System 100 can further include a replication queue component 130 which, in response to the transient properties of a file 12 being determined by the replication conditioning component 120 to have satisfied a replication condition, can add the file 12 to an associated replication queue 20. Files 12 queued by the replication queue component 130 can then be copied and/or otherwise replicated to a secondary file storage, e.g., as will be described below with respect to FIG. 4.

In an aspect, system 100 can provide enhanced replication functionality via the use of transient file information as compared to techniques that utilize static filters based only on parameters such as file extension or file path. Various aspects as described herein can varying levels of RPO to files residing even in a same directory and/or files with the same extension. This can add a dynamic element to replication since, for example, when a user's privileges are elevated over time files associated with that user need not be moved to a different directory for a better RPO. Also or alternatively, the techniques provided herein can improve the functionality of a computing system by, e.g., reducing computing overhead (e.g., in terms of processor cycles, network bandwidth, power consumption, etc.) associated with excessive replication of files or other information having a relatively low priority or criticality.

In another aspect, system 100 can be utilized to replicate files edited by a specific user or set of users between two adjacent replication runs, thereby meeting different RPO parameters for different users. Various additional advantages of the aspects described herein are as follows. A data storage system can be given the ability to differentiate between different files belong to and/or written by different levels of users in a replication policy. A data storage system can also be given the ability to define varying RPO levels for files created and/or modified by high-importance users even if those files reside in the same directory as other, less important files. A system administrator can be given greater control over what information is replicated in the system and when said information is replicated. In a cloud setting and/or similar implementations, a replication solution can be given the ability to distinguish between varying tiers of service, e.g., by assigning different quality of service and associated RPOs to different subscribers based on the terms of their respective subscriptions. Other advantages are also possible.

Figure 2:
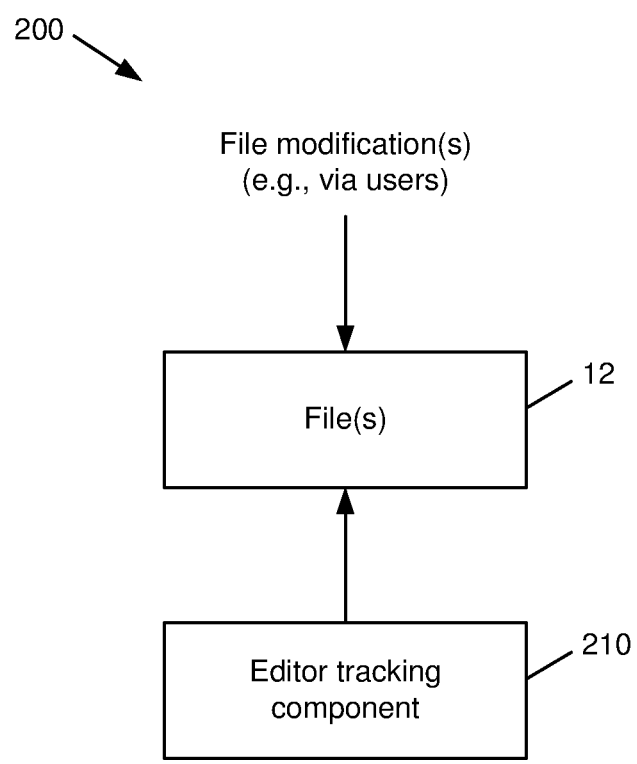
FIG. 2 is a block diagram of a system that facilitates tracking modifications to a file stored by a data storage system in accordance with various aspects described herein.

Turning now to FIG. 2, a block diagram of a system 200 that facilitates tracking modifications to a file stored by a data storage system in accordance with various aspects described herein is illustrated. Repetitive description of like elements employed in other embodiments described herein is omitted for brevity. As shown by FIG. 2, one or more files 12 associated with a data storage system can be modified (e.g., by respective system users) on an ongoing basis. In an aspect, system 200 includes an editor tracking component 210 that can respond to an editor (e.g., an editing user) saving a modification to a file 12 by recording an identifier (e.g., a system username or handle and/or other information) corresponding to that editor. In an aspect, the editor tracking component 210 can record information pertaining to editors of a given file in an extended attribute of the file, as will be described in further detail in the following description.

Figure 3:
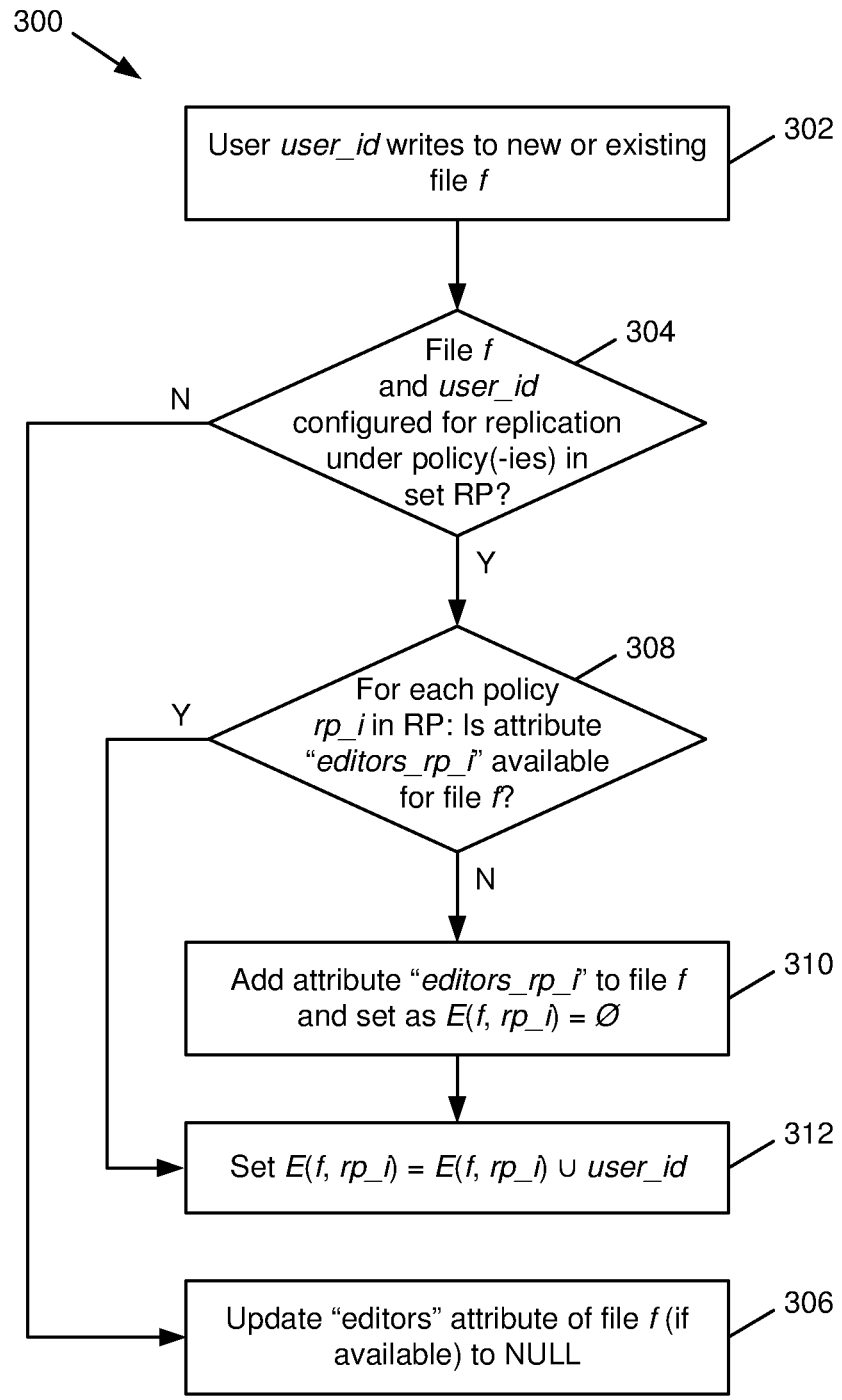
FIG. 3 is a flow diagram of a method for maintaining file editor information within a set of file attributes in accordance with various aspects described herein.

In an aspect, a method 300 that can be utilized by the editor tracking component 210 for recording file editor information is illustrated by FIG. 3. As shown in FIG. 3, method 300 can begin at 302, in which a user with identifier user_id writes a new file f or modifies an existing file f.

Next, at 304, the editor tracking component 210 can determine whether the file f and the user user_id are configured for replication according to one or more replication policies in a set of replication policies, denoted here as RP. This check as performed at 304 can determine, e.g., both whether the file f belongs to any replication policy in RP as well as whether the user user_id is pertinent to any of said policies. This combined determination can enable the same file to be associated with multiple replication policies that may utilize the same or different file attributes or other associated information.

If it is determined at 304 that file f and/or user user_id are not configured for replication, the editor tracking component can infer that replication based on user data has not been configured for file f. As a result, method 300 can conclude at 306, wherein an "editors" attribute of file f, if available, is set to NULL.

Otherwise, in response to a positive determination at 304, method 300 can proceed to 308, wherein, for each replication policy $rp_i$ in set RP, the editor tracking component 210 can determine whether an extended attribute "editors_rp_i" is available for file f. If any extended attributes corresponding to replication policies in RP are not present, the editor tracking component 210 can add the relevant attribute(s) editors_rp_i and initialize said attributes by setting them to the empty set, e.g., $E(f, rp\_i)=\emptyset$, as shown at 310. Following initialization of any missing attributes editors_rp_i at 310, the editor tracking component 210 can append user_id to the attributes of file f corresponding to the replication policies that are pertinent to user user_id, e.g., by setting $E(f, rp\_i)=E(f, rp\_i) \cup user\_id$, as shown at 312. In an aspect, the result of the operation shown at 312 is the previously existing set of modifying users for file f and replication policy $rp_i$ to which user user_id is added via the union operator if said user was not previously included in the set.

While method 300 and various other aspects described herein refer to editor tracking on the basis of individual users, it should be appreciated that the editor tracking component 210, the replication conditioning component 120, and/or other components as described herein can operate on the basis of user groups or other groupings of individual editors in addition to, or in place of, individual editors. By way of specific example, the editor tracking component 210 can make the determination at 304 as described above by first identifying a group of users that are configured for replication and then determining whether the user user_id is a member of that group. A grouping as used in this manner can be based on user groups as established by the operating system of the data storage system (e.g., a UNIX user group, etc.), an authentication provider associated with the data storage system, a system administrator or other system operator, and/or any other entities, systems, etc., that can define groupings of users.

Figure 4:
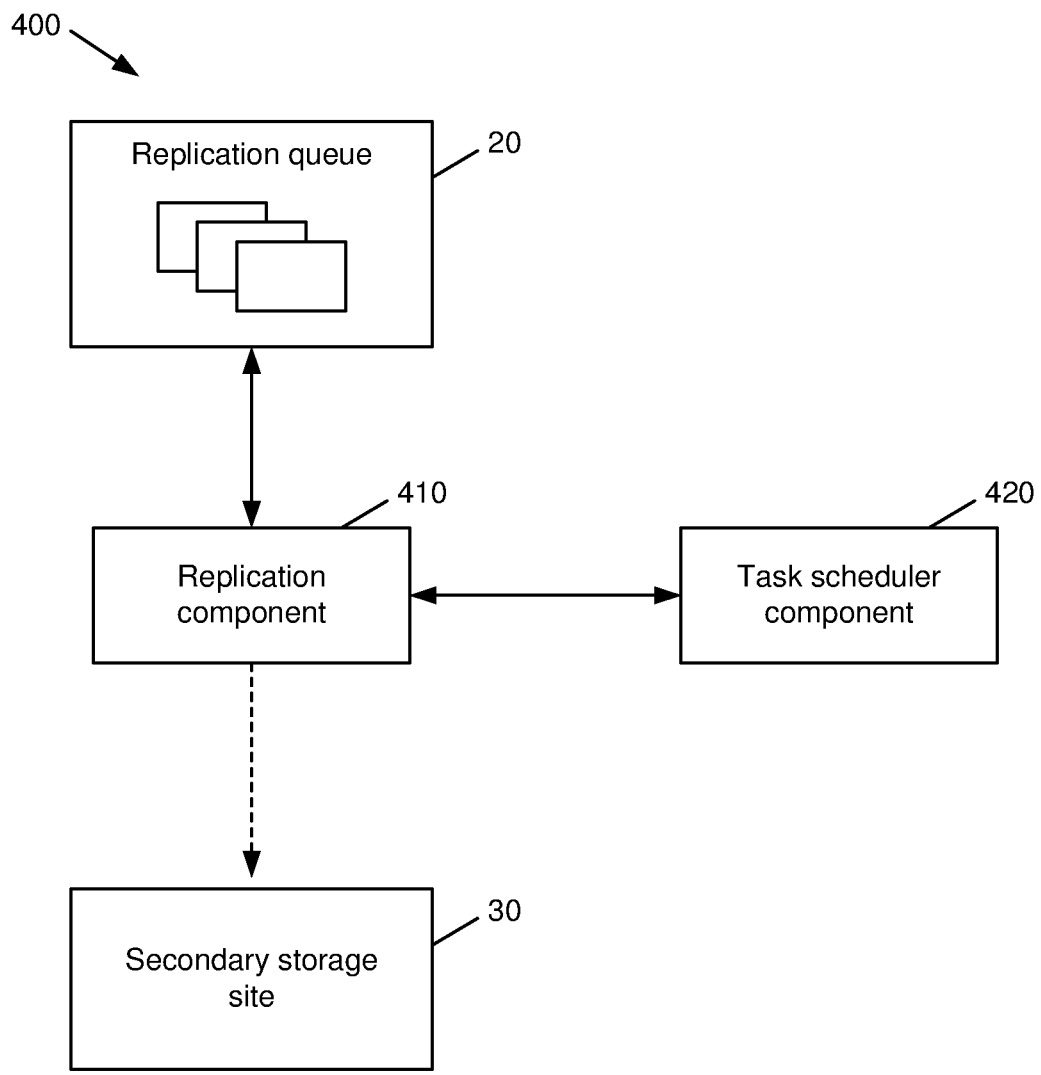
FIG. 4 is a block diagram of a system that facilitates replication of queued files to a secondary data storage site in accordance with various aspects described herein.

With reference next to FIG. 4, a block diagram of a system 400 that facilitates replication of queued files to a secondary data storage site 30 in accordance with various aspects described herein is illustrated. Repetitive description of like elements employed in other embodiments described herein is omitted for brevity. As shown by FIG. 4, system 400 includes a replication component 410 that can replicate respective files in the replication queue 20, e.g., in response to the files being added to the replication queue 20 by the replication queue component 130, to a secondary file storage site 30. System 400 as shown by FIG. 4 further includes a task scheduler component 420 that can schedule replication for the respective files in the replication queue 20 at a given time, e.g., a time associated with an underlying replication policy associated with the replication queue 20. In an aspect, the task scheduler component 420 can provide a replication schedule to the replication component 410 to enable the replication component 410 to replicate the files in the replication queue 20 at a time set by the task scheduler component 420 that is associated with the replication policy (-ies) for the replication queue 20.

Figure 5:
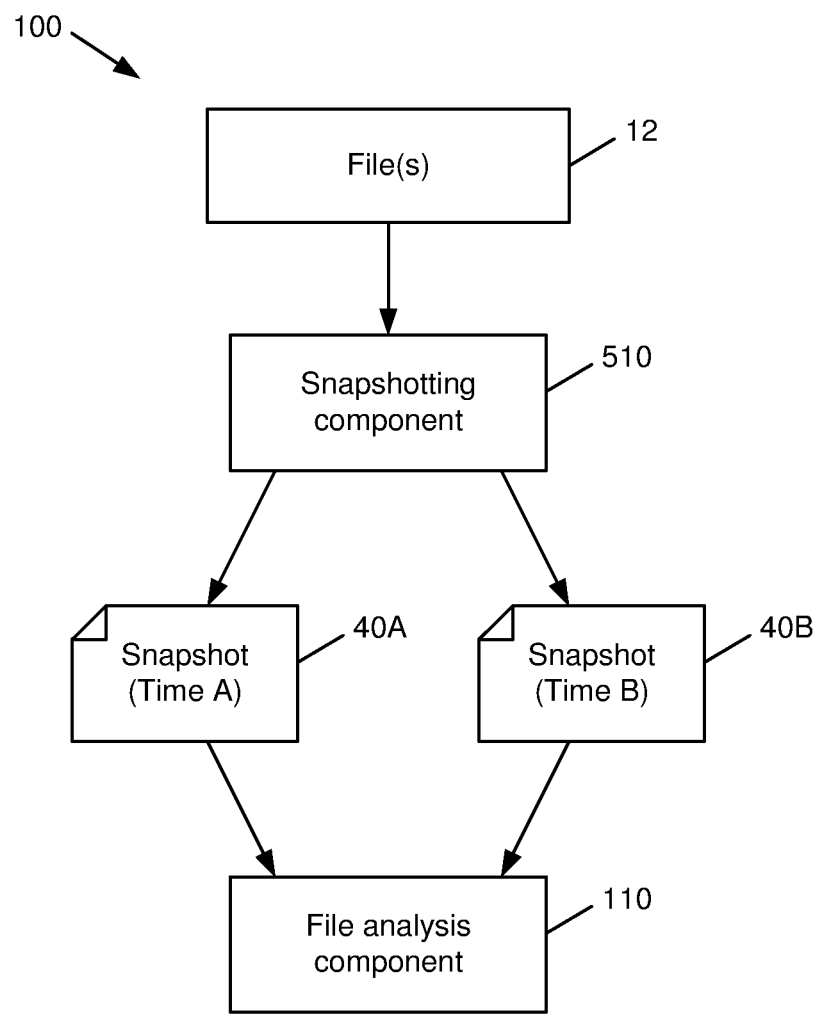
FIG. 5 is a block diagram of a system that facilitates file snapshotting and modification detection in accordance with various aspects described herein.

In an aspect, the replication component 410 can leverage snapshotting, deduplication, and/or other techniques to identify files that have been modified since a preceding replication in order to avoid network overhead and/or other resources associated with replication of unmodified files. Turning to FIG. 5, a block diagram of a system 500 that facilitates file snapshotting and modification detection in accordance with various aspects described herein is illustrated. Repetitive description of like elements employed in other embodiments described herein is omitted for brevity. System 500 as shown in FIG. 5 includes a snapshotting component 510 that can create data snapshots 40 corresponding to one or more files 12. In the example shown in FIG. 5, the snapshotting component 510 can create a first data snapshot 40A at a first time (time A) and a second data snapshot 40B at a second time (time B). It should be appreciated that the snapshotting component 510 could also take other snapshots in addition to, or in place of, data snapshots 40A-B as shown in system 500.

In another aspect, a data snapshot 40 as created by the snapshotting component 510 can be a representation of one or more underlying files 12. In one example, a snapshot of a file 12 can simply be a copy of the file 12 with its contents, attributes, and/or other information intact. In other examples, a snapshot of a file 12 can utilize compression, deduplication, and/or other techniques to reduce the size of the snapshot relative to the size of the underlying file 12. For instance, in the example shown in system 500, data snapshot 40A could be a full snapshot of one or more files 12 while data snapshot 40B can be an incremental snapshot that reflects only the changes to the files 12 relative to the full data snapshot 40A. Other techniques for generating data snapshots 40 could also be employed by the snapshotting component 510.

In response to a set of data snapshots 40 being created for the file(s) 12, the file analysis component 110 can utilize the data snapshots 40A-40B as further shown in system 500 to determine, e.g., by comparing the data snapshots 40A and 40B, whether the file(s) 12 have been modified between the times associated with the respective snapshots 40A-40B, e.g., time A and time B. If the file analysis component 110 determines based on this comparison that respective file(s) 12 corresponding to data snapshots 40A-40B have not been modified, the file analysis component 110 can omit the unmodified files from further replication processing, e.g., by the replication conditioning component 120 and/or the replication queue component 130 as described above.

In an aspect, the data snapshots 40 generated by the snapshotting component 510 can be generated at fixed points in time and reflect the modifications that have been saved to the underlying file(s) 12 at those corresponding points in time. As a result, any ongoing modifications to a file 12 that have not been saved at the time a data snapshot 40 is taken will not be reflected in that data snapshot 40 in order to reduce complications associated with detecting changes to a file 12 after its data snapshot 40 has been created.

While the file analysis component 110 illustrated in system 500 can analyze data snapshots 40 associated with a file 12 to determine whether the file 12 has been modified since a previous replication, it should be appreciated that the file analysis component 110 could additionally or alternatively use other techniques. For instance, the file analysis component 110 could compare a timestamp associated with a last modification of a file 12 to the time at which the file 12 was last replicated to determine whether the file 12 has been modified since the last replication. Other techniques could also be used.

Figure 6:
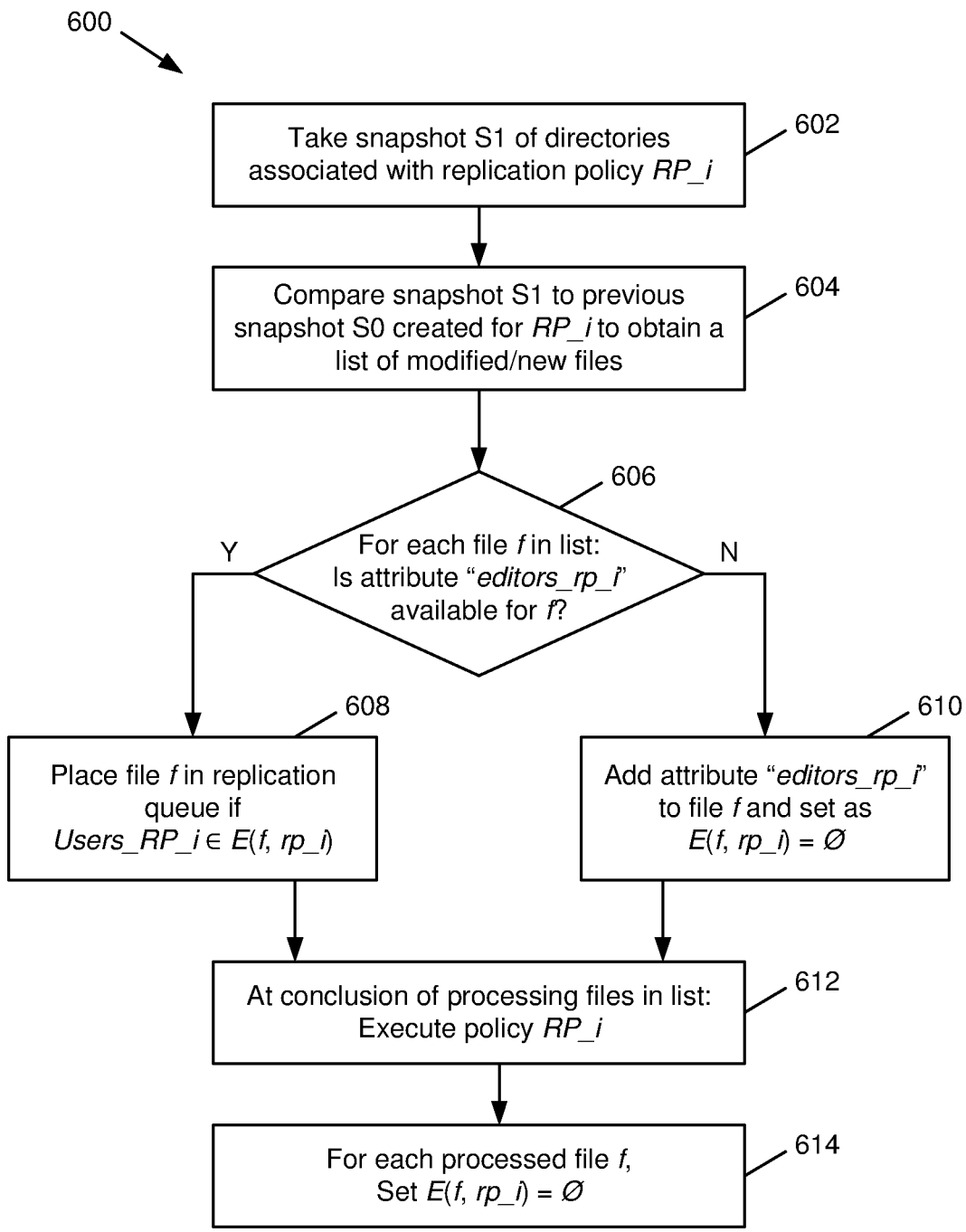
FIG. 6 is a flow diagram of a method for maintaining and processing a file replication queue in accordance with various aspects described herein.

Referring next to FIG. 6, a flow diagram of a method 600 for maintaining and processing a file replication queue 20 in accordance with various aspects described herein is illustrated. At 602, a snapshot S1 can be taken (e.g., by the snapshotting component 510) of directories associated with a given replication policy $RP_i$. While 602 indicates that snapshots are taken of directories, it should be appreciated that snapshots could also or alternatively be taken of specific files within given directories, the contents of some or all of a storage volume or storage site, and/or any other suitable unit(s) of data.

At 604, the snapshot S1 taken at 602 is compared (e.g., by the file analysis component 110) to a previous snapshot S0 created for replication policy $RP_i$ to obtain a list of modified and/or new files. In an aspect, the previous snapshot S0 can be taken before a replication of the files associated with the snapshot such that a replication has occurred between the times associated with snapshots S0 and S1 in a similar manner to that described above with respect to FIG. 5.

At 606, for each file f in the list of modified/new files obtained at 604, it is determined (e.g., by the editor tracking component 210 and/or other suitable components) whether an attribute editors_rp_i is available for file f. For files f for which this attribute is available, method 600 proceeds to 608, wherein the file f is placed in a replication queue 20 (e.g., by the replication queue component 130 based on direction from the replication conditioning component 120) if any users associated with replication policy $RP_i$ are listed as editors of file f in the attribute editors_rp_i, e.g., if Users_RP_i∈E(f, rp_i). Conversely, for files f for which the editors attribute is not available, method 600 instead proceeds to 610, wherein the attribute editors_rp_i is added to file f and initialized as the empty set, e.g., E(f, rp_i)=Ø.

Upon the conclusion of processing each file in the list generated at 604 as described at 606-610 above, method 600 proceeds to 612, in which replication policy $RP_i$ is executed, e.g., via the replication component 410 replicating the files added to the replication queue for policy $RP_i$ to a secondary storage site 30.

At 614, after successful execution of policy RPi, the replication component 410 can clear any transient information utilized in determining whether to replicate respective files in snapshot S1. For instance, the replication component can remove the list of editors stored in attribute editors_rp_i of a given file f by setting said attribute to the empty set, e.g., E(f, rp_i)=Ø.

Figure 7:
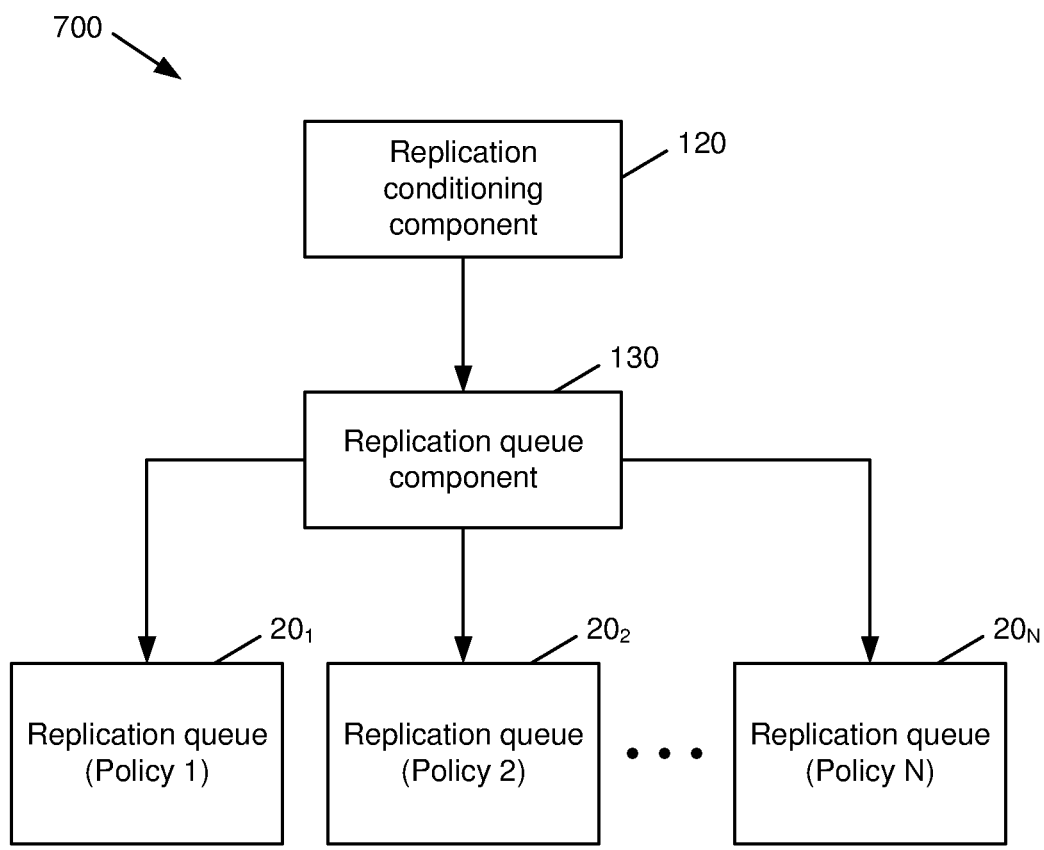
FIG. 7 is a block diagram of a system that facilitates maintaining a group of file replication queues in accordance with various aspects described herein.

Turning now to FIG. 7, a block diagram of a system 700 that facilitates maintaining a group of file replication queues 20 in accordance with various aspects described herein is illustrated. Repetitive description of like elements employed in other embodiments described herein is omitted for brevity. As shown by system 700, the replication conditioning component 120 can facilitate processing of multiple replication policies concurrently by determining whether transient properties (e.g., editor information, etc.) of a given file satisfy respective replication conditions associated with a group of different replication policies, here a group of N replication policies. It should be appreciated that the notation utilized in FIG. 7 is not intended to imply any specific number of replication policies, and the replication conditioning component 120 can perform determinations with respect to any number of policies including one policy or more policies.

In an aspect, the replication queue component 130 as shown in system 700 can operate based on guidance from the replication conditioning component 120 to add respective files to respective ones of a group of replication queues 20, here a group of N replication queues $20_1$-$20_N$ corresponding to the N replication policies, that correspond to replication conditions that have been satisfied by the transient properties of the file as determined by the replication conditioning component 120. These replication queues 20, once populated by the replication queue component 130, can be processed by the replication component 410 as described above. In another aspect, files added to the replication queues 20, or the replication queues 20 themselves, can be associated with properties such as priority values that can affect the manner in which they are processed by the replication component 410. Various examples of properties that can be considered by the replication component 410 with respect to queue and/or file priority are described in further detail below.

In another aspect, the replication queue component 130, and/or other components as described above, can facilitate the creation of new replication queues 20 and/or corresponding replication policies. For instance, when a new replication policy has been created and enabled, a group of users associated with the new replication policy can be recorded by the replication conditioning component 120 such that the editor tracking component 210 can start adding respective user identifiers and/or other information relating to file editors that is referred to in the replication policy (e.g., via a parameter Users_$RP_i$) to respective files 12 that are set up to be replicated by the new policy $rp_i$ when a user makes a modification to the files 12, e.g., as described above with respect to method 300.

Figure 8:
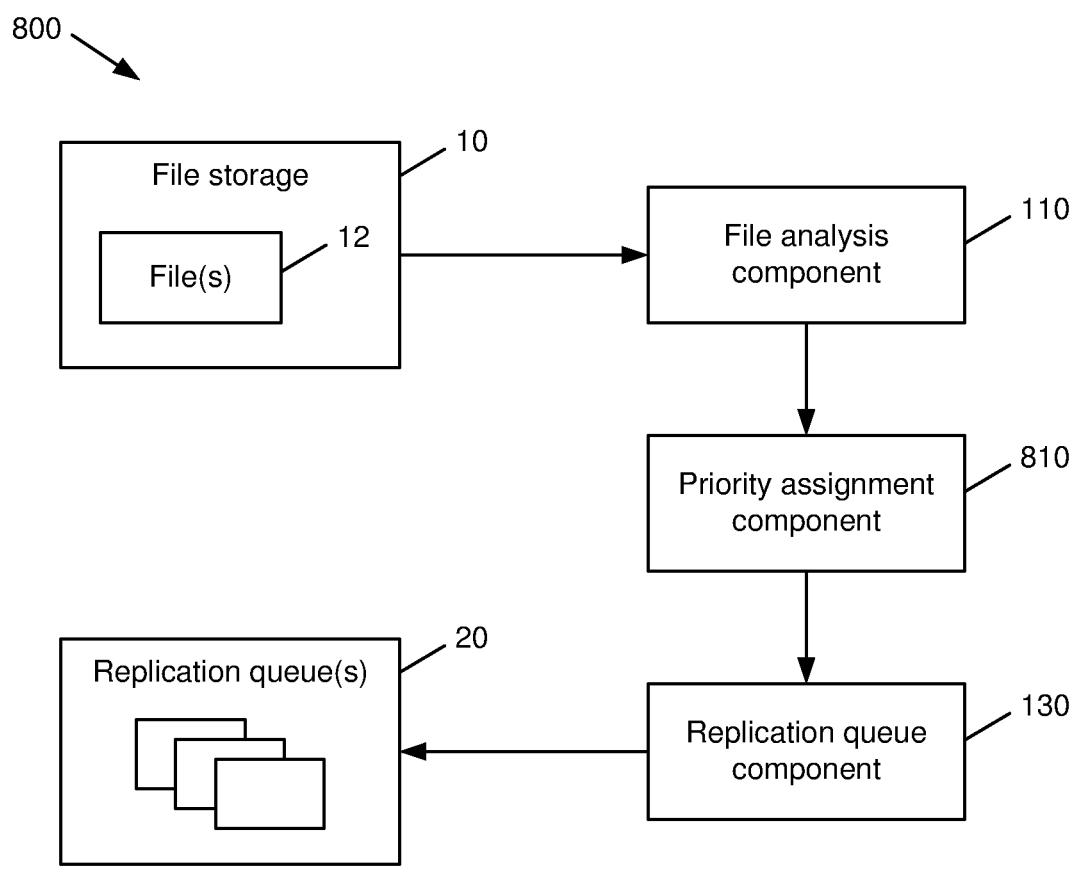
FIG. 8 is a block diagram of another system that facilitates user-based recovery point objectives for disaster recovery in a data storage system in accordance with various aspects described herein.

With reference now to FIG. 8, a block diagram of another system 800 that facilitates user-based recovery point objectives for disaster recovery in a data storage system in accordance with various aspects described herein is illustrated. Repetitive description of like elements employed in other embodiments described herein is omitted for brevity. As shown in FIG. 8, system 800 includes a file analysis component 110 that can extract transient properties of respective files 12 stored by system 800, e.g., via a file storage 10, in a similar manner to that described above with respect to FIG. 1.

System 800 as shown in FIG. 8 further includes a priority assignment component 820 that can assign priority levels to respective files 12 as analyzed by the file analysis component 110 based on the transient properties of those files 12, e.g., file editor information or the like, as noted above. System 800 further includes a replication queue component 130 that can queue the respective files 12 for replication, e.g., by placing the respective files 12 into one or more replication queues 20, in an order defined by the priority levels assigned to the files 12 by the priority assignment component 810.

In an aspect, the order in which files 12 are placed into replication queues 20 by the replication queue component 130 as described above can be relative to different replication queues 20 and/or different files 12 within a same replication queue 20. For instance, as will be discussed in further detail below with respect to FIG. 11, the replication queue component 130 can place files 12 into replication queues 20 based on the relative priority levels of the respective files 12 as well as priority values assigned to respective ones of a set of replication queues 20. Other techniques are also possible.

Figure 9:
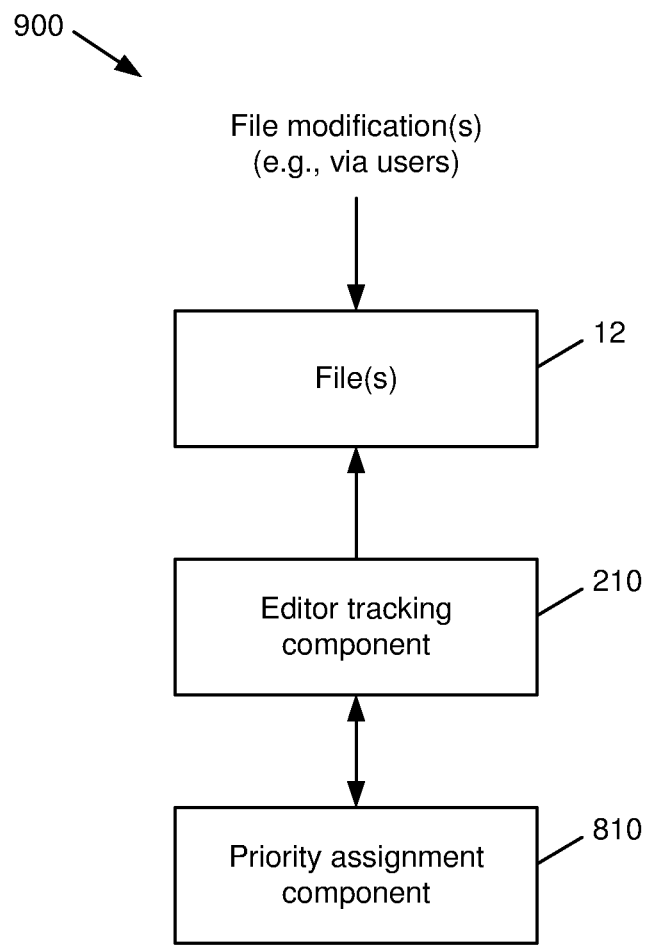
FIG. 9 is a block diagram of a system that facilitates assigning replication priority levels to respective files via tracking file modifications in accordance with various aspects described herein.

Referring next to FIG. 9, a block diagram of a system 900 that facilitates assigning replication priority levels to respective files 12 via tracking file modifications in accordance with various aspects described herein is illustrated. Repetitive description of like elements employed in other embodiments described herein is omitted for brevity. In a similar manner to system 200 shown in FIG. 2 above, system 900 can include an editor tracking component 210 that records identifiers and/or other information corresponding to an editor of a file 12, e.g., in an extended attribute of the file 12, in response to that editor saving a modification to the file 12 and/or that editor being associated with a replication policy that applies to the file 12.

As further shown in FIG. 9, the editor tracking component 210 can operate in combination with the priority assignment component 810 to enable priority determinations to be made by the priority assignment component 810 as modifications to a file 12 are made. In an aspect, the priority assignment component 810 can assign priority levels to individual users and/or groups of users based on the relative criticality of the users or user groups and/or other factors. These priority levels can be designated by number (e.g., priority 0, priority 1, etc.), by extent of criticality (e.g., low priority, high priority, highest priority, etc.), and/or by any other suitable means. Based on these priority levels, the priority assignment component 810 can assign priority levels to respective files 12 based on the originator(s) of edit(s) made to the files 12 as they are recorded by the editor tracking component 210.

In an aspect, priority levels as defined by the priority assignment component 810 and/or other system components can be static, or alternatively they can be configured to change over time and/or based on circumstances associated with the network and/or its users. For instance, a user tasked with creating quarterly earnings reports could be given a higher priority rating as the disclosure date for a report approaches relative to other times. In another aspect, priority levels can be global to a system and/or configured to vary based on particular files 12 and/or replication policies assigned to those files 12. For example, a given user could be regarded as a high priority editor for a first file but a low priority editor for a second file. As another example, multiple replication policies could be defined for the same file 12 that specify different sets of users. A replication policy can also be assigned to no specific users, e.g., for the case of a default replication policy for a given file 12 that defines a minimum RPO for that file.

Figure 10:
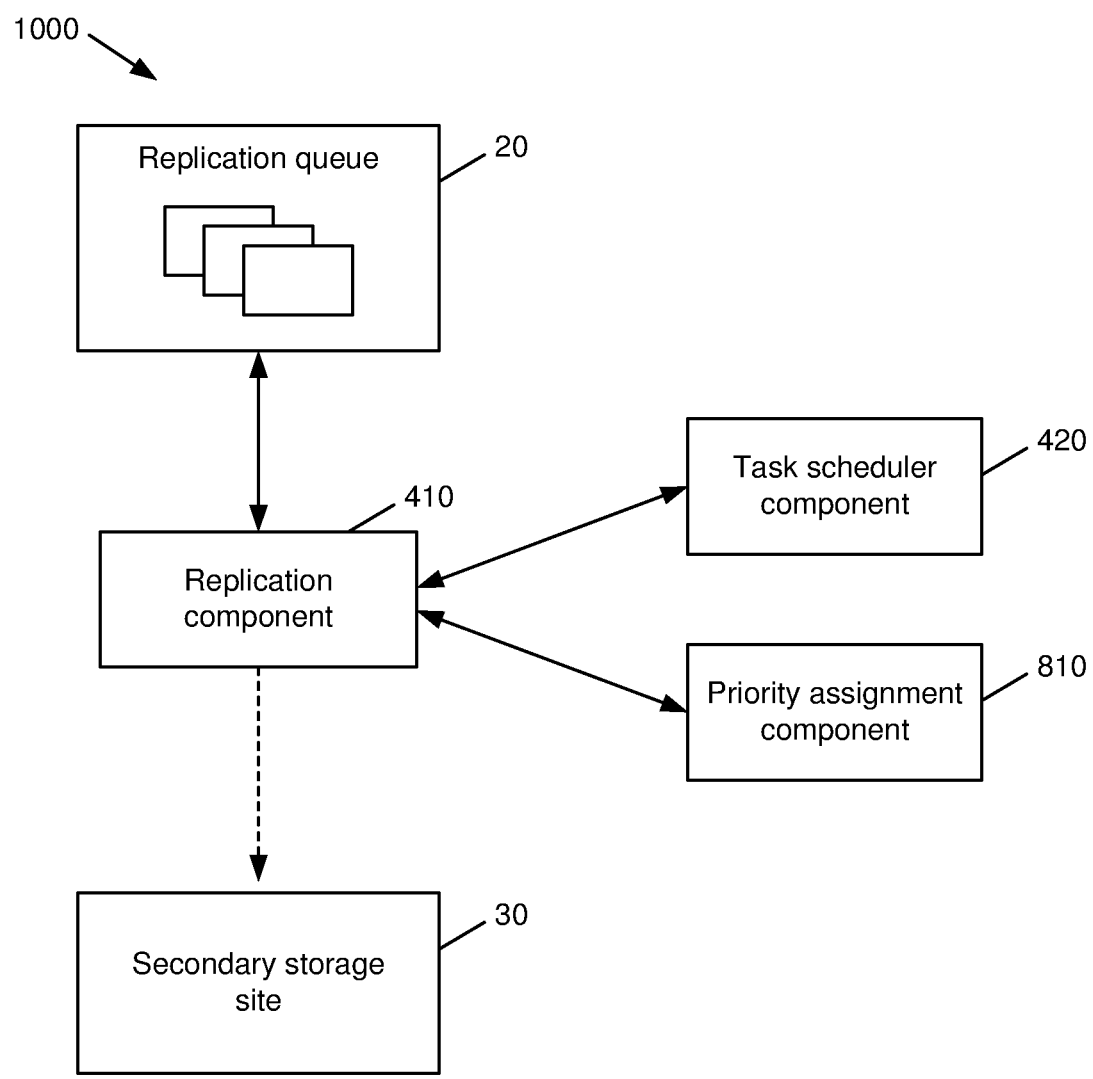
FIG. 10 is a block diagram of a system that facilitates replication of queued files to a secondary data storage site according to assigned priority values in accordance with various aspects described herein.

With reference now to FIG. 10, a block diagram of a system 1000 that facilitates replication of queued files to a secondary data storage site 30 according to assigned priority values in accordance with various aspects described herein is illustrated. Repetitive description of like elements employed in other embodiments described herein is omitted for brevity. System 1000 as shown in FIG. 10 includes a replication component 410 that can facilitate replication of respective files that are queued in one or more replication queues 20 to a secondary storage site 30, e.g., at times scheduled by a task scheduler component 420, as generally described above with respect to FIG. 4.

In an aspect, the task scheduler component 420 as shown in system 1000 can utilize priority data generated by the priority assignment component 810 to schedule replication for respective replication queues 20 at time intervals corresponding to the priority levels associated with those replication queues 20 by the priority assignment component 810. These time intervals can be determined based on, among other factors, RPOs for respective files and/or users as described above.

Figure 11:
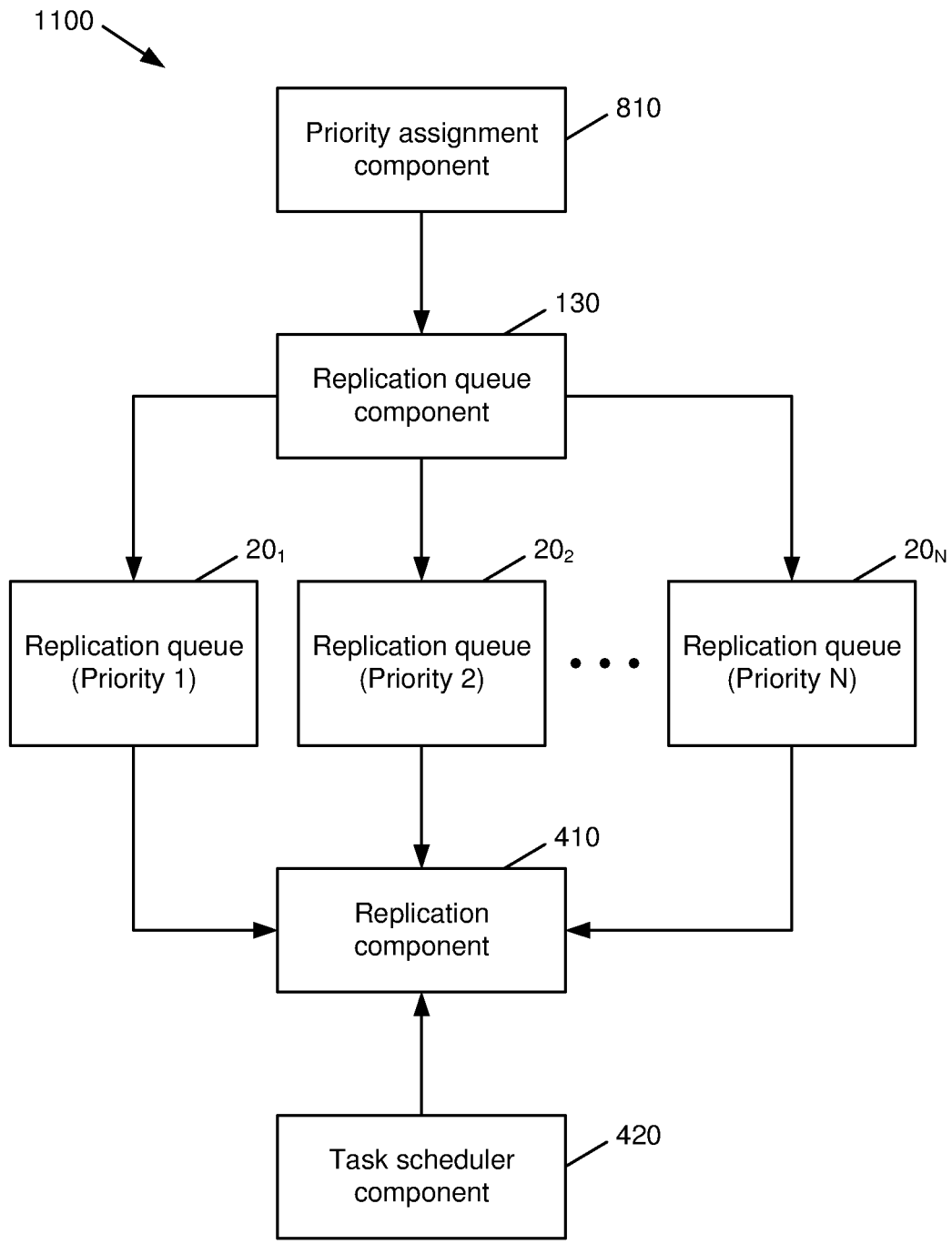
FIG. 11 is a block diagram of a system that facilitates maintaining and processing a group of file replication queues with corresponding priority levels in accordance with various aspects described herein.

In another aspect, a block diagram of a system 1100 that illustrates generation and use of multiple replication queues 20 for different priority levels is shown by FIG. 11. Repetitive description of like elements employed in other embodiments described herein is omitted for brevity. As shown by FIG. 11, the replication queue component 130 can queue respective files by placing the files into one or more of a group of replication queues 20, here N replication queues $20_1$-$20_N$. Similar to FIG. 7 above, it should be appreciated that the notation utilized for the replication queues 20 in FIG. 11 is not intended to imply any specific number of replication queues 20, and that the replication queue component 130 can utilize any number of replication queues 20 including one queue or multiple queues.

As further shown in FIG. 11, the respective replication queues $20_1$-$20_N$ can be associated with replication policies that, in turn, can be associated with respective priority levels as designated by the priority assignment component 810. As system 1100 additionally illustrates, the replication component 410 can obtain information relating to the group of replication queues $20_1$-$20_N$ and their corresponding priority levels and process respective ones of the replication queues 20 at times scheduled by the task scheduler component 420 based at least in part on the priority values assigned to the replication queues $20_1$-$20_N$.

In an aspect, in the event that multiple replication queues 20 are scheduled by the task scheduler component 420 for replication at the same time, the replication component can process the queued files by replicating the queued files in an order determined by the priority levels associated with the respective replication queues 20. By way of example, if a first replication queue $20_1$ associated with a comparatively high priority and a second replication queue $20_2$ associated with a comparatively low priority are scheduled for replication at the same time, the replication component 410 can prioritize the higher priority replication queue $20_1$ and replicate the files in said queue before replicating any files in the comparatively lower priority replication queue $20_2$. Other techniques could also be used.

Figure 12:
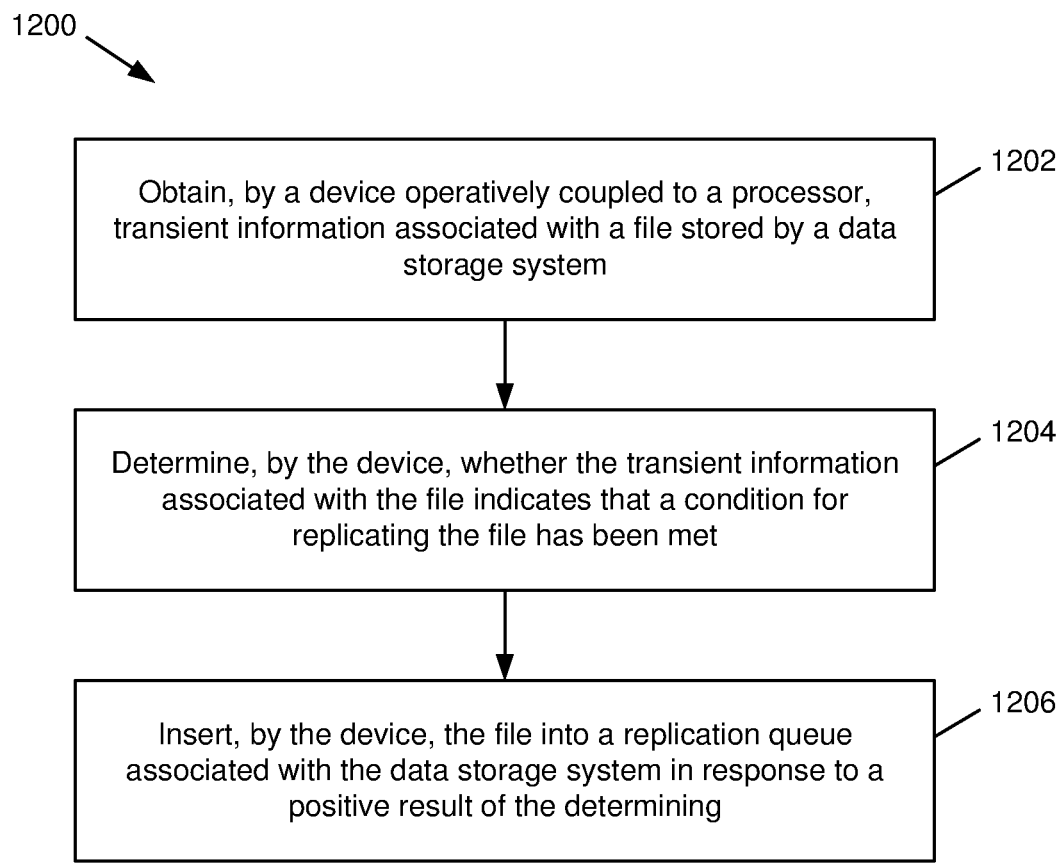
FIGS. 12-13 are flow diagrams of respective methods that facilitate user-based recovery point objectives for disaster recovery in accordance with various aspects described herein.

Referring next to FIG. 12, a flow diagram of a method 1200 that facilitates user-based RPOs for disaster recovery in accordance with various aspects described herein is illustrated. At 1202, a device operatively coupled to a processor can obtain (e.g., by a file analysis component 110) transient information (e.g., editor data, etc.) associated with a file (e.g., a file 12) stored by a data storage system.

At 1204, the device can determine (e.g., by a replication conditioning component 120) whether the transient information associated with the file as obtained at 1202 indicates that a condition for replicating the file has been met.

At 1206, the device can insert (e.g., by a replication queue component 130) the file into a replication queue associated with the data storage system in response to a positive result of the determination at 1204, e.g., in response to the transient information associated with the file indicating that a condition for replicating the file has been met.

Figure 13:
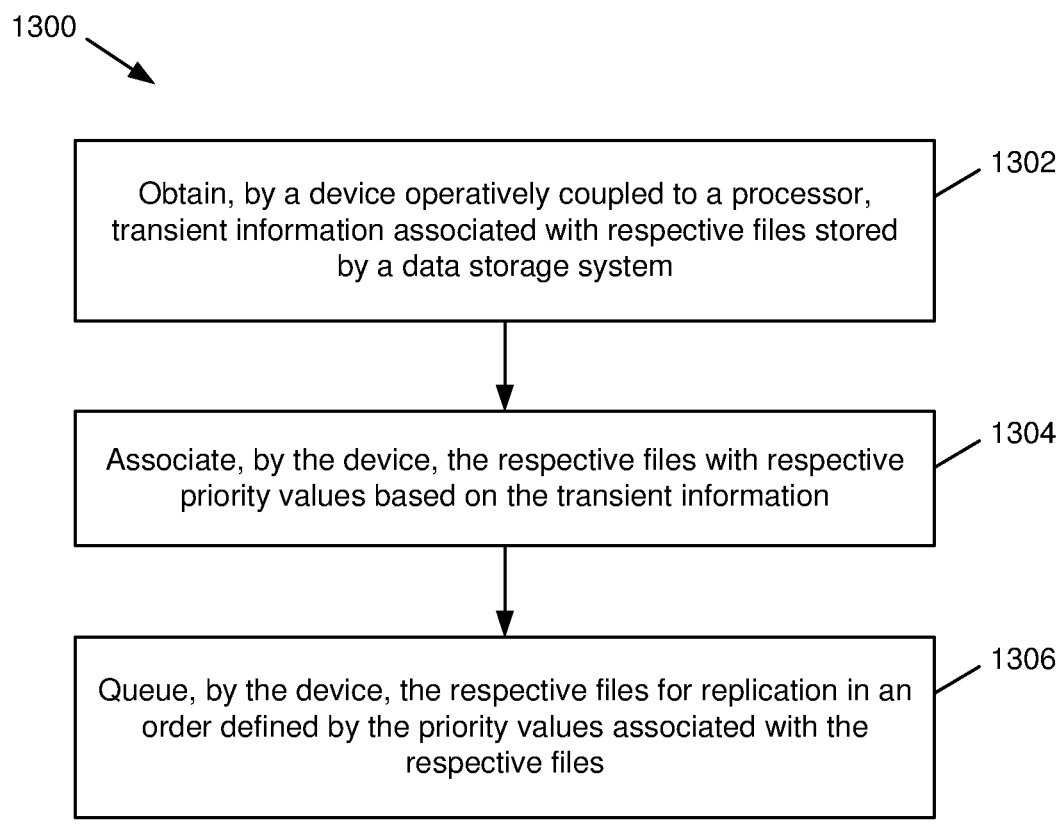

Turning to FIG. 13, a flow diagram of another method 1300 that facilitates user-based RPOs for disaster recovery in accordance with various aspects described herein is illustrated. At 1302, a device operatively coupled to a processor can obtain (e.g., by a file analysis component 110)

transient information (e.g., editor data, etc.) associated with respective files (e.g., files 12) stored by a data storage system.

At 1304, the device can associate (e.g., by a priority assignment component 810) the respective files with respective priority values based on the transient information relating to the files as obtained at 1302.

At 1306, the device can queue (e.g., by a replication queue component 130) the respective files in an order defined by the priority values that were associated with the respective files at 1304.

FIGS. 3, 6, 12, and 13 as described above illustrate methods in accordance with certain aspects of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 14:
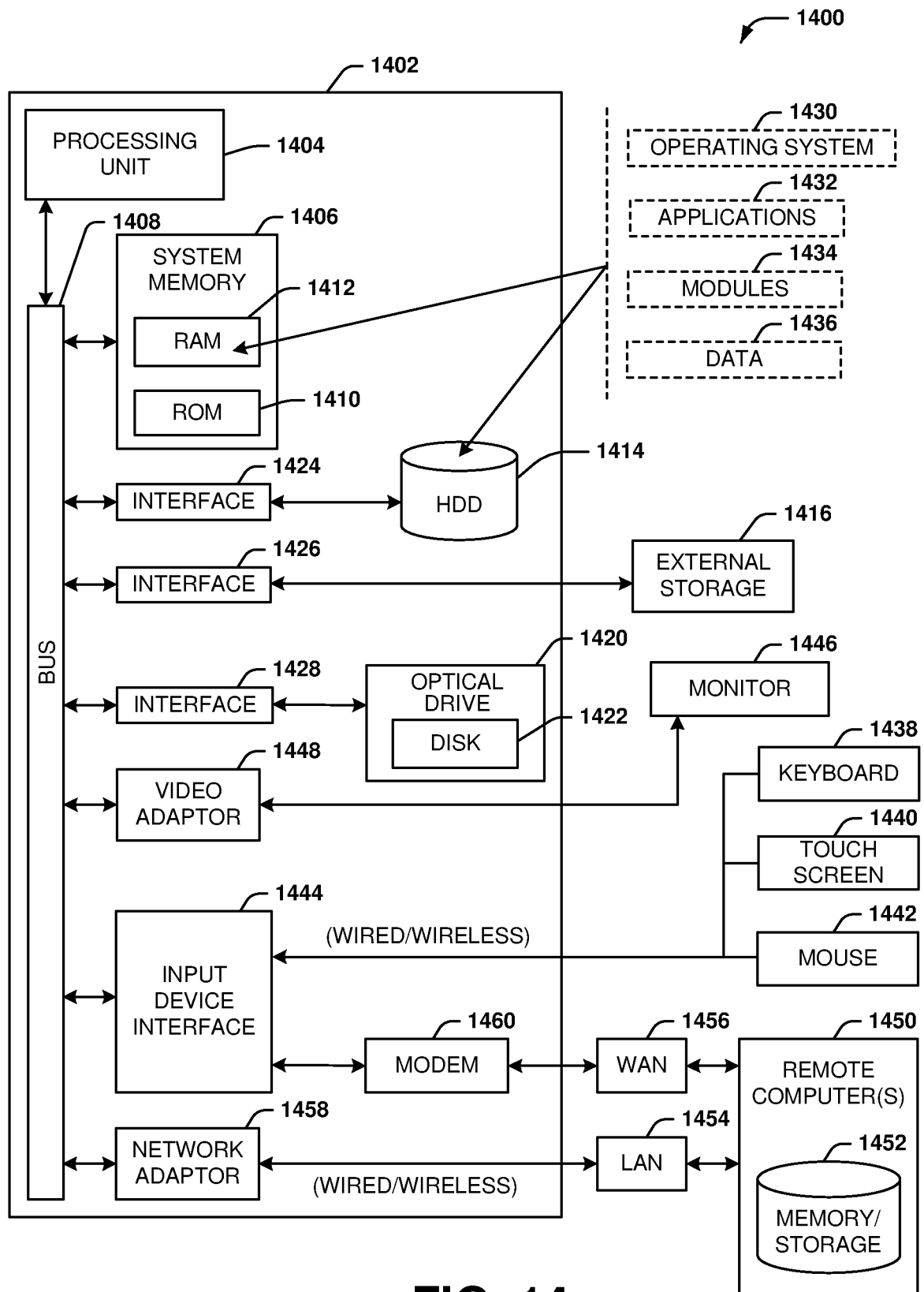
FIG. 14 is a diagram of an example computing environment in which various embodiments described herein can function.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD), a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
   a memory that stores computer executable components; and
   a processor that executes computer executable components stored in the memory, wherein the computer executable components comprise:
   a file analysis component that extracts transient properties of a file stored by the data storage system;
   a replication conditioning component that determines whether the transient properties of the file satisfy a replication condition as defined by the data storage system;
   a replication queue component that adds the file to a replication queue associated with the data storage system in response to the transient properties of the file being determined to have satisfied the replication condition; and
   a replication component that replicates respective files in the replication queue to a secondary file storage site at a time associated with a replication policy for the replication queue in response to the file being added to the replication queue, wherein the replication component clears the transient properties from the file in response to the file being determined to have been successfully replicated to the secondary file storage site.

2. The data storage system of claim 1, wherein the transient properties of the file comprise identifiers of editors of the file.

3. The data storage system of claim 2, wherein the computer executable components further comprise:
   an editor tracking component that records a first identifier corresponding to a first editor of the file in response to the first editor saving a modification to the file and further in response to the first editor being associated with a replication policy for the file.

4. The data storage system of claim 3, wherein the editor tracking component records the first identifier in an extended attribute of the file.

5. The data storage system of claim 1, wherein the computer executable components further comprise:
a snapshotting component that creates a first data snapshot corresponding to the file at a first time and a second data snapshot corresponding to the file at a second time, wherein the file is replicated between the first time and the second time, and wherein the file analysis component determines whether the file has been modified between the first time and the second time by comparing the first data snapshot to the second data snapshot.

6. The data storage system of claim 5, wherein the replication queue component adds the file to the replication queue further in response to the file analysis component determining that the file was modified between the first time and the second time.

7. The data storage system of claim 1, wherein the replication condition is a first replication condition, wherein the replication queue is a first replication queue, and wherein the replication conditioning component determines whether the transient properties of the file satisfy respective ones of a group of replication conditions that includes the first replication condition.

8. The data storage system of claim 7, wherein the replication queue component adds the file to respective ones of a group of replication queues corresponding to replication conditions of the group of replication conditions that have been satisfied by the transient properties of the file, and wherein the group of replication queues includes the first replication queue.

9. A method, comprising:
obtaining, by a device operatively coupled to a processor, transient information associated with a file stored by a data storage system;
determining, by the device, whether the transient information associated with the file indicates that a condition for replicating the file has been met;
inserting, by the device, the file into a replication queue associated with the data storage system in response to a positive result of the determining;
copying, by the device, respective files in the replication queue to a secondary file storage site at a time associated with a replication policy for the replication queue in response to the file being inserted into the replication queue; and
clearing, by the device, the transient information from the file in response to successful completion of the copying.

10. The method of claim 9, wherein the transient information comprises identifiers of editors of the file.

11. The method of claim 10, further comprising:
recording, by the device, a first identifier corresponding to a first editor of the file in response to the first editor saving a modification to the file and further in response to the first editor being associated with a replication policy for the file.

12. The method of claim 11, wherein the recording comprises recording the first identifier in an extended attribute of the file.

13. The method of claim 9, further comprising:
creating, by the device, a first data snapshot corresponding to the file at a first time; and
creating, by the device, a second data snapshot corresponding to the file at a second time, wherein the file is copied to the secondary file storage site between the first time and the second time.

14. The method of claim 13, further comprising:
comparing, by the device, the first data snapshot and the second data snapshot, wherein the inserting comprises inserting the file into the replication queue further in response to a result of the comparing indicating that the file was modified between the first time and the second time.

15. A non-transitory machine-readable medium comprising computer executable instructions that, when executed by a processor of a data storage system, facilitate performance of operations, the operations comprising:
reading transient properties of a file stored by the data storage system;
determining whether the transient properties of the file satisfy a trigger condition for replication of the file;
appending the file to a replication queue associated with the data storage system in response to the transient properties of the file satisfying the trigger condition;
replicating respective files in the replication queue to a secondary file storage site at a time associated with a replication policy for the replication queue in response to the file being added to the replication queue; and
clearing the transient properties from the file in response to the file successfully being replicated to the secondary file storage site.

16. The non-transitory machine-readable medium of claim 15, wherein the transient properties of the file comprise user identifiers corresponding to editors of the file.

17. The non-transitory machine-readable medium of claim 16, wherein the operations further comprise:
recording a first user identifier corresponding to a first editor of the file in response to the first editor saving a modification to the file and further in response to the first editor being associated with a replication policy for the file.

18. The non-transitory machine-readable medium of claim 17, wherein the operations further comprise:
recording the first user identifier in an extended attribute of the file.

19. The non-transitory machine-readable medium of claim 15, wherein the operations further comprise:
generating a first data snapshot corresponding to the file at a first time; and
generating a second data snapshot corresponding to the file at a second time, wherein the file is replicated to the secondary file storage site between the first time and the second time.

20. The non-transitory machine-readable medium of claim 19, wherein the operations further comprise:
comparing the first data snapshot and the second data snapshot; and
appending the file to the replication queue further in response to a result of the comparing indicating that the file was modified between the first time and the second time.

\* \* \* \* \*